Dec. 3, 1968  W. L. GRAVES  3,414,450
METHOD OF MAKING A MOLDED TOOTHED GEAR OF RESIN-IMPREGNATED
FIBROUS STRIPS
Filed Nov. 25, 1964

INVENTOR.
WILLIAM L. GRAVES
BY
ATTORNEY

United States Patent Office 3,414,450
Patented Dec. 3, 1968

3,414,450
METHOD OF MAKING A MOLDED TOOTHED GEAR OF RESIN-IMPREGNATED FIBROUS STRIPS
William L. Graves, Newark, Del., assignor to The Budd Company, Philadelphia, Pa., a corporation of Pennsylvania
Filed Nov. 25, 1964, Ser. No. 413,774
4 Claims. (Cl. 156—192)

ABSTRACT OF THE DISCLOSURE

A method of forming gear teeth from fabric material includes the steps of forming thin strips of resin impregnated material into a wrapper strip. The wrapper strip is then helically wound about a mandrel at a predetermined angle. The resin impregnated strips are normal to the angle of helix of the gear teeth to be formed.

---

This invention relates to improvements in the construction of molded laminated gear blanks for gears with helically cut teeth, and more particularly concerns the orientation of the laminations so as to produce an edgewise wearing surface to the wearing surfaces of the helically cut teeth.

In the gear making art, it is common to mate a non-metallic gear, for example a gear made with laminations of resin-impregnated fabric, with gears made of metallic substances. This is done primarily to reduce the noise level of the resulting gear train. A primary type of non-metallic gear used is that made by molding a blank comprising a rim of laminations of fabric impregnated with a resin, a resin impregnated macerated fabric web and a metallic bushing. The gear teeth are then cut into the rim of this blank.

One of the more important uses of laminated rim gears is to time internal combustion engines. They have proven to be very successful in reducing the noise level of the engine but have a major disadvantage in relatively poor resistance to wear as compared with metallic gears. For accurate timing it is essential that the timing gear train of an internal combustion engine have a minimum of backlash. The conventional laminated rim gears have a limited useful life in internal combustion engines because as the gear wears the backlash increases and the accuracy of the timing decreases.

This problem of poor resistance has been known for many years in the art and many attempts have been made to improve the quality of the gear. The most notable of these has been to use wear resistant resins. Another method has been to improve the base fabric of the laminates by using purified cotton duck or other special materials such as asbestos. These expedients have only been partially successful and more improvement is required.

It has been found in laminates of the type used for gear rims that the wear resistance of the edgewise portions of the laminate is considerably greater than the wear at flatwise sections of the laminate. In the laminates the edgewise section is the end grain of the laminate and the flatwise section is the surface of the laminate.

In the prior art the laminations of the gear rim were aligned normally to the central axis of the gear. Timing gears are made with helical teeth in order to get a rolling action and therefore a more even timing of the engine. Therefore when helical teeth were cut into the gear rim the wearing surface presented was a combination of the edgewise and flatwise surface due to the oblique angle of contact of the helically oriented teeth with respect to the normally oriented laminations of the rim.

It has been found that if the laminaions of the rim are oriented helically, and in the preferred embodiment, ninety degrees to the angle of entry of the helically oriented teeth, that a gear with increased wear resistance will be obtained.

Accordingly, it is the object of this invention to improve the wear resistance of laminated rimmed plastic gears.

It is a further object of the invention to provide a method to helically wind the laminations of the rim of a laminated gear and thereby produce a structure into which helically cut teeth can be oriented normally to the laminations of the rim and thereby increase wear resistance.

Other objects and advantages of this invention will further become apparent hereinafter in this specification and in the drawing in which.

Figure 1:
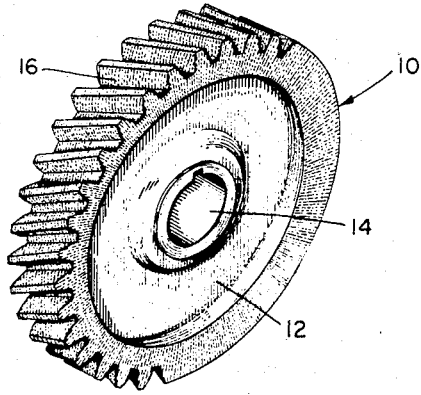
FIG. 1 is a perspective view of a partially machined laminated rimmed plastic gear blank for a gear with helical teeth.

In describing the preferred embodiment of the invention illustrated in the drawing, specific terminology will be resorted to for the sake of clarity. However, it is not intended to be limited to the specific terms selected and it is to be understood that it includes all technical equivalents which operate in a similar manner to accomplish a similar purpose.

FIG. 1 is an illustration of a typical laminated plastic gear blank comprising a laminated rim 10, made of plies of resin-impregnated fabric, a web 12 usually made of resin-impregnated macerated fabric and a bushing 14. Helically cut gear teeth 16 are shown cut into a portion of the blank and it can be observed that the plies are oriented normally to the wearing surfaces of the gear teeth.

Figure 2:
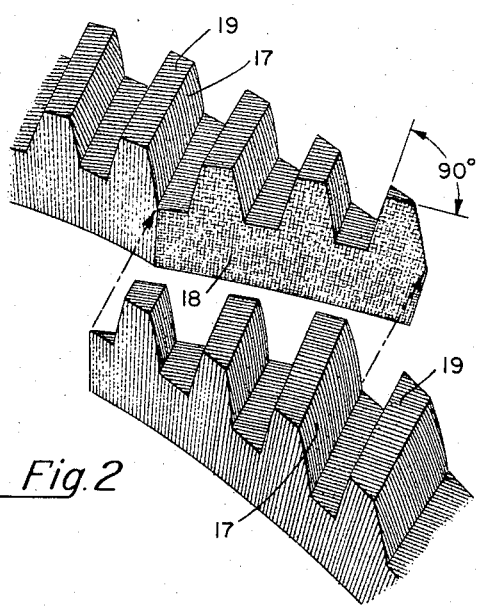
FIG. 2 is a fragmentary perspective view of a laminated rim into which helical teeth have been cut and which has been split along one of the laminations.

This orientation of the plies and the wearing surfaces of the gear teeth 17 can also be observed in FIG. 2. A section of laminated rim is shown split along one of the laminae 18. The angle of contact between the edgewise surface of laminations and the wearing surface of the gear teeth is shown as the preferred 90°.

Figure 3:
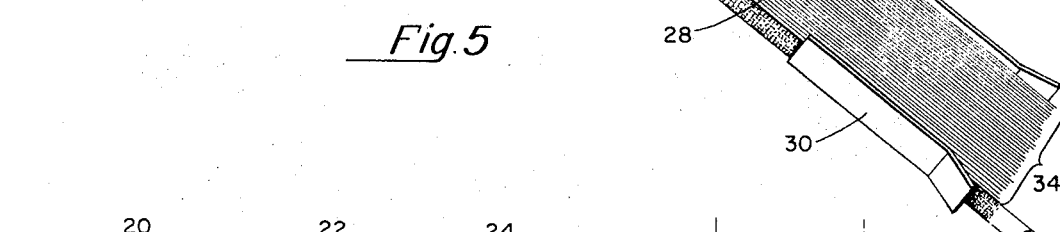
FIG. 3 is a diagrammatic view of the top land of a laminated helical gear tooth, showing the relationship of the ply orientation and the wearing surfaces of the gear teeth.

FIG. 3 diagrammatically illustrates the preferred method of orienting the laminations of the rim with respect to the wearing surface of the gear teeth 17.

It should be noted that the ninety degree angle of contact is the preferred angle of contact but that any orientation of the plies of the rim from the point where they are substantially normal to the axis of the gear to the point where they are normal to the wearing surface of the gear will increase the wear resistance of the gear and any such orientation of the plies is within the scope of this invention.

In the manufacture of helically wound rims, geometric relationships such as the helical angle $\phi$ of the teeth which will be cut into the blank, the diameter of the laminated rim, and other geometric relationships must be considered in order to produce a rim in which the laminations are oriented so that there is no overlapping or voids between the plies and where the laminations are oriented according to the teaching of this invention.

Figure 5:
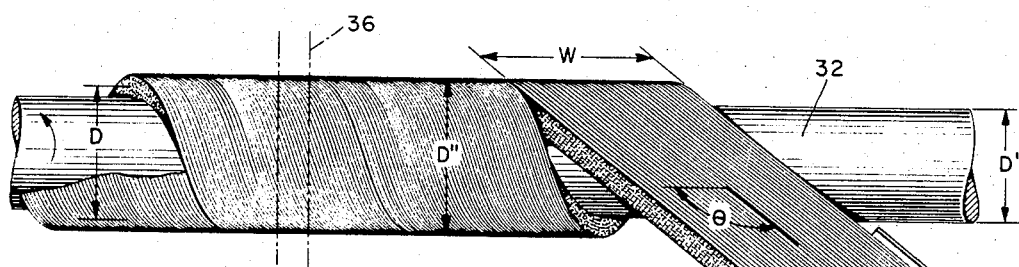
FIG. 5 illustrates the helically winding of laminations about a mandrel.

Referring to FIG. 5, the entry angle of the skelp $\theta$ is the angle which is obtained by subtracting the helix angle $\phi$ of the gear teeth from the desired angle of contact between the edgewise portion of the laminations and the wearing surface of the teeth. In the preferred embodiment of this invention the angle of contact is ninety degrees. (See FIG. 2.)

In the determination of the skelp width, the diameter of the rim is a critical factor. Since the fabric is wound on its edge, instead of flatwise, it can be seen that the thickness of the rim T is a factor. The diameter that is used in the calculation can be one of several; namely, the inside diameter of the rim, the outside diameter of the rim or a compromise of the two diameters. It has been found that the best results are obtained if the average of the inside diameter D′ and the outside diameter D″ is used, in that there is a relative balance between the compression of the fabric on the inside of the rim and the stretching of the fabric on the outside as it is wound on the mandrel 32. Therefore, for the calculation of the average of the outside diameter and the inside diameter of the rim will be used as D.

$$D = \frac{D' + D''}{2}$$

The relationship between skelp width W and the skelp entry angle $\theta$ with respect to the generatrix of a cylinder of the circumference of C, is given by the formula $$W = C \cos \theta$$

Therefore, since the circumference can be determined from the diameter and the skelp entry angle $\theta$ can be determined as shown above, it is possible to determine the width of the skelp 34 that is required to be fed into the rim in order to produce a rim that is wound with uniformly spaced laminations.

The number of plies required is determined by multiplying the laminations per inch of the laminate times the width in inches of the skelp. An example of the use of the above method of calculating the angle of entry, the width of the skelp and the number of laminations is shown below for a particular gear, but it should be noted that this method will work for any gear.

EXAMPLE

The gear is to have teeth with a thirty degree helix angle. The gear is to be made out of a 15 oz. cotton duck which duck has been impregnated with a phenolic resin and which, when laminated, has 43 laminations per inch. The rim has an inside diameter of 5.150 inches and an outside diameter of 6.225 inches.

$\theta$ = skelp entry angle
C = angle of contact
$\phi$ = angle of helix (1)
$\theta = C - \phi$
$\theta = 90°$ (preferred angle of contact) $-30°$
$\theta = 60°$ (2)
$$D = \frac{\text{Inside diameter} + \text{outside diameter}}{2}$$

$$D = \frac{5.150 \text{ in.} + 6.225 \text{ in.}}{2}$$

D = 5.68 in.

(3)
C = D × 3.14
C = 5.68 × 3.14
C = 17.8 in.

(4)
W = C cos $\theta$
W = 17.8 × .500
W = 8.9 in.

(5)
Number of laminations in the skelp = W × lamination per inch
Number of laminations in the skelp = 8.9 in. × 43 per inch
Number of laminations in the skelp = 383 laminations The method of making the laminated rim with the helically oriented lamina comprises the following steps: A suitable base fabric is impregnated with a suitable resin. The base fabric used is generally a cotton duck of between 4 and 20 oz. per square yard. The resin used may be any of a broad class of resins but the most commonly used are the phenolic resins.

The method of treating the fabric depends on the type of base fabric used and the particular resin used and these methods are well known in the art. The prepreg is then cut into strips. The strips are preferably cut in the warpwise direction but it is possible to cut them in the filling direction or on a bias.

Figure 4:
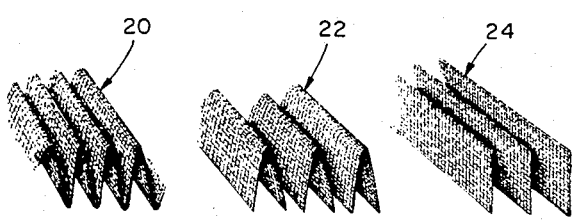
FIG. 4 illustrates three methods of preparing laminations for the helical winding of the rim.

In FIG. 4 the various methods of preparing the fabric for the helical winding step are demonstrated. The lamination can be prepared in a fan fold arrangement 20 or in series of doubled sections 22 or as a plurality of single plies 24. The fanfold method 20 is the best in that the strips are easier to handle than either the double or the single strips in the large numbers that are required to make the rim. The single strip method 24 has advantages in that the strips are easier to cut and are simple to remove from the skelp than the fanfolded material or the doubled strips if an adjustment in the width of the skelp is desired. The doubled form has some of the advantages and disadvantages of both the fanfolded and the single ply methods.

The required number of laminations, as determined in the above steps is prepared in a skelp 28 which is fed through a suitable guide 30. The guide is set at the desired angle of entry $\theta$. It appears to be advisable to heat the guide slightly so as to make the laminations more ductile. The skelp end is then attached to a mandrel 32 which turns and advances as the lamina are wound. The skelp is then permitted to run through the guide and wind helically around the mandrel. An alternate method is to use a shaft which rotates but which does not advance and to use a guide which advances as the tube is helically wound.

The laminations are wound on the shaft until there are enough laminations to make at least five gears. This is due to economic conditions rather than a technical problem.

When a sufficient number of laminations has been wound on the shaft the skelp is cut and the ends are attached to the shaft. With most types of resin the next step is to heat the laminations with the resin to a point high enough to cause the resin to soften and cause adhesion between the laminations but not high enough to cure the resin. With certain resins, for example phenolics, it is desirable to apply pressure while the resins are soft, to insure that the laminations will adhere to each other. When there is sufficient adhesion between the laminations to cause the laminations to adhere in the form of a cylinder, the mandrel is removed and the individual rims 36 indicated by the dotted lines are cut from the cylinder.

The preferred method for cutting the rim from the tube is to use a sharp saw. The rims are still relatively fragile at this stage and will delaminate if they are handled too roughly. The rims made of the prepreg material are converted into a finish blank by molding it under heat and pressure in combination with a suitable web material and a bushing. In the molding of the gear blank it should be noted that the rim must be inserted in the mold so that when the teeth are cut into the blank the lamination will be oriented substantially normal to the wearing surface of the gear teeth. The spiral of the rim laminations should run in the opposite direction to the spiral of the teeth. The heat and pressure needed to cure the resin is dependent on the particular resin used and the conditions for curing these resins are well known in the art.

The helically oriented teeth are cut into the molded blank by methods that are well known. As in the above step care must be taken to cut the teeth so that the edges of the laminations are oriented substantially normal to he wearing surfaces of the teeth.

It is to be understood that the form of the invention herewithin shown is to be taken as the preferred embodiment. Various changes can be made in the shape, size and arrangement of parts. For example, equivalent elements may be substituted for those illustrated and described herein, without departing from the spirit and scope of the invention as defined in the subjoined claims. For instance, the same method of orientation of plies may be used on rack and pinions and internal gears to gain the same advantage as described herein.

Having thus described my invention I claim:

1. A method of making a molded toothed gear of resin-impregnated fibrous strips with the plies of the laminations of said strips being oriented normally to the wearing surfaces of the helically cut gear teeth in the finished gear comprising forming a wrapping of resin-impregnated strips cut from a base textile fabric, helically winding said wrapping edgewise about a mandrel at a selected angle with respect to the angle of the finished gear teeth, heating the wound strip to soften and partially cure the resin, cutting an individual rim from the wound structure, molding said rim under heat and pressure to form a gear blank, and cutting teeth into said blank so that the rim laminations are oriented substantially normal to the wearing surface of the said teeth.

2. A method as specified in claim 1 wherein said wrapping constitutes a fan folded arrangement of said individual strips.

3. A method as specified in claim 1 wherein said wrapping constitutes a doubled arrangement of said individual strips.

4. A method as specified in claim 1 wherein the wrapping constitutes a plurality of single plies of said individual strips.

References Cited
UNITED STATES PATENTS

| | | | |
|---|---|---|---|
| 1,275,906 | 8/1918 | Guay | 74—445 |
| 1,424,267 | 8/1922 | Tupper | 74—445 XR |
| 1,981,782 | 11/1934 | D'Aubigne | 74—445 |

PHILIP DIER, *Primary Examiner.*